United States Patent
Iwasaki et al.

(10) Patent No.: US 7,426,396 B2
(45) Date of Patent: Sep. 16, 2008

(54) WIRELESS COMMUNICATION SYSTEM, WIRELESS COMMUNICATION APPARATUS, AND WIRELESS COMMUNICATION METHOD

(75) Inventors: Jun Iwasaki, Tokyo (JP); Shigeru Sugaya, Kanagawa (JP); Satoshi Konya, Kanagawa (JP); Yasuhiko Mizoguchi, Tokyo (JP); Hideki Iwami, Saitama (JP)

(73) Assignee: Sony Corporation, Tokyo (JP)

( * ) Notice: Subject to any disclaimer, the term of this patent is extended or adjusted under 35 U.S.C. 154(b) by 783 days.

(21) Appl. No.: 10/777,664

(22) Filed: Feb. 13, 2004

(65) Prior Publication Data

US 2004/0223477 A1 Nov. 11, 2004

(30) Foreign Application Priority Data

Feb. 17, 2003 (JP) ............................. 2003-038698

(51) Int. Cl.
*H04M 7/00* (2006.01)
(52) U.S. Cl. .................. 455/456.1; 455/456.6; 455/458
(58) Field of Classification Search ................ 455/446, 455/411, 422.1, 412.1, 67.13, 448, 450, 422, 455/433, 442, 414.1, 457, 458, 459, 456.1–456.6
See application file for complete search history.

(56) References Cited

U.S. PATENT DOCUMENTS 6,535,743 B1 * 3/2003 Kennedy et al. .......... 455/456.1
6,594,483 B2 * 7/2003 Nykanen et al. ............. 455/411
6,681,107 B2 * 1/2004 Jenkins et al. ........... 455/412.1
7,027,773 B1 * 4/2006 McMillin .................... 455/41.2

* cited by examiner

*Primary Examiner*—Tony T Nguyen
(74) *Attorney, Agent, or Firm*—Oblon, Spivak, McClelland, Maier & Neustadt, P.C.

(57) ABSTRACT

A wireless communication apparatus is provided in which a frequency band, a signal type, and a transmission power conforming to radio law of a country that uses a first wireless communication system are set by means of a receiving status of a specific signal of a second wireless communication system, so that user friendly wireless communication apparatus regarding operations thereof can be provided. In the wireless communication system 1 according to the present invention, an area information acquisition portion 2 acquires information on an area in which the wireless communication system presently exists. Based on communication setting information in the wireless communication system corresponding to area information stored in an information memory portion 4, an area information judgment portion 3 judges communication setting information capable of being set in the wireless communication system in accordance with the area information acquired from the area information acquisition portion 2. Based on the communication setting information judged by the area information judgment portion 3, communication parameter control setting portion 5 controls communication settings of the wireless communication system.

4 Claims, 14 Drawing Sheets

| GPS Information | Country Name | Interfering Frequency Band to be Eliminated |
|---|---|---|
| N. LAT. AA° E. LONG. A° | Japan | 5.15-5.25 GHz |
| N. LAT. BB° E. LONG. B° | USA | 5.15-5.35 GHz & 5.725-5.825 GHz |
| N. LAT. CC° E. LONG. C° | Germany | 5.15-5.35 GHz & 5.47-5.725 GHz |

| Second Communication System Information | | | Parameter of First Communication System | | |
|---|---|---|---|---|---|
| SID | NID | BSID | Frequency Bandwidth | Signal Type | Transmission Output Power |
| US | West Coast | ... | Plan A | Type A | Level A |
| | Mid West | ... | Plan A | Type A | Level A |
| | East | ... | Plan A | Type A | Level A |
| JP | Hokkaido | ... | Plan C | Type B | Level U |
| | Tohoku | ... | Plan C | Type B | Level X |
| | Kanto | ... | Plan C | Type B | Level X |
| | Chubu | ... | Plan C | Type C | Level Y |
| | Hokuriku | ... | Plan C | Type C | Level Y |
| | Kinki | ... | Plan C | Type C | Level Z |
| | Chugoku | ... | Plan C | Type C | Level Z |
| | Shikoku | ... | Plan C | Type C | Level W |
| | Kyushu | ... | Plan C | Type C | Level V |
| EU | Germany | ... | Plan D | Type G | Level C |
| | UK | ... | Plan E | Type E | Level C |
| | France | ... | Plan F | Type F | Level B |
| | Sweden | ... | Plan G | Type G | Level C |

WIRELESS COMMUNICATION SYSTEM, WIRELESS COMMUNICATION APPARATUS, AND WIRELESS COMMUNICATION METHOD

BACKGROUND OF THE INVENTION

1. Field of the Invention

The present invention relates to a wireless communication system, a wireless communication apparatus and a wireless communication method which are suitable for use in, for example, a wide band communication system.

2. Description of the Related Art

Recently, a wide band communication system which is represented by an Ultra Wideband (hereinafter referred to as a UWB) communication method such as shown in Japanese Laid-open Patent Application No. 2002-335252 has been actively developed. A system so far approved for usage has a frequency bandwidth per one channel of approximately several tens MHz. Accordingly, it becomes necessary to secure a transmission rate by using multiple-value modulation or the like in order to perform high speed transmission of 100 Mbps or higher.

In short, a high S/N ratio is required. Then, there is a trend of giving an approval to a system having very low transmission level to such an extent that another system does not receive interference, but instead, using a frequency band of 500 MHz or higher. One example thereof is the UWB. For example, in case of a UWB system, it is also possible to use a frequency band which is used by another system. In other words, in case of a wide band communication system, it is mandatory not to cause interference to another system (interfering) but at the same time, it is also important not to receive interference (interfered) from another system.

In order not to receive interference, for example, a band-pass filter (hereinafter referred to as a BPF) is provided prior to a LNA (Low Noise Amp) on a receiver side, for example. It is for the purpose of preventing the LNA from being saturated by the power of another system and from deteriorating its amplification processing function. In other words, it becomes important to eliminate a frequency range of another system by means of the band-pass filter in a frequency range which is used by the wide band communication system.

Also, a system in which a wireless local area network is constructed among a plurality of wireless communication apparatuses using a wireless signal which conforms to IEEE 802.11 has conventionally been known. In recent years, a system in which a wireless personal area network is constructed so as to cover a narrower range than the wireless local area network and at the same time, to realize ultra high speed communication has also been proposed. As the system of this wireless personal area network, a wireless communication system conforming to IEEE 802.15.3 is standardized.

Further, with respect to this wireless personal area network, a high speed wireless transmission method using, for example, a UWB wireless signal has been studied. Furthermore, in a wireless local area network conforming to IEEE 802.11b, a wireless communication apparatus is used in accordance with radio law in which common frequency bandwidths are used in respective countries.

Moreover, apart from the above, in case of a wireless local area network conforming to IEEE 802.11a in which radio law differs from country to country, there is a difference in frequency bandwidth allowed to use in each country where a user makes use of. Accordingly, in the wireless local area network conforming to IEEE 802.11a, it has been necessary to include a unit for obtaining information to identify a country where the network is used by means of a signal transmitted from an access point and informing a frequency channel which can be used at a wireless communication apparatus that becomes a terminal device.

Therefore, as a signal type of a system of the wireless personal area network, a UWB communication system has been considered to use. Namely, in a certain wireless communication system, a method in which a communication system available for usage is detected and select a frequency band available for usage in the country has been required.

[Patent Reference 1]

Japanese Laid-open Patent Application No 2002-335252 official bulletin

However, the position of a wide band wireless terminal is moved in the conventional wide band communication system described above. For example, when the wide band wireless terminal is moved to another country, there is such an inconvenience of receiving interference, because naturally a system is operated differently in each country and with regard to a system using a frequency which is not assumed, the frequency can not be eliminated favorably.

Accordingly, the present invention is made in view of the above described aspect, and it is an object of the present invention to provide a wireless communication system, a wireless communication apparatus, and a wireless communication method, which can prevent interference from another apparatus, even when the wide band wireless terminal is moved.

Also, since a signal type diffused over a wide band has been used as a signal used in the wireless communication system conforming to IEEE 802.15.3, there is a risk in which a frequency bandwidth used for another wireless communication system overlaps with the frequency bandwidth of the diffused signal over the wide band. Accordingly, there has been such a problem that restrictions are imposed on the frequency bandwidth or the signal type which is allowed to use in a UWB wireless signal based on a method for using a frequency band which is determined in each country.

Due to the above, there arises such a problem that a UWB wireless communication apparatus manufactured in accordance with radio law of a certain country does not conform to radio law of another country, and therefore can not be used in that country. Furthermore, there has been such a risk that a UWB wireless communication apparatus having settings of another country transmits a signal in a frequency band or a signal type which is not permitted to transmit in the corresponding country.

Moreover, since the UWB signal is being diffused over a wide band, there is a possibility that usage thereof is restricted in an area having a facility in its neighborhood such as, for example, a radio wave astronomical observatory which receives a feeble radio signal or the like. Furthermore, if a UWB wireless communication apparatus purchased in one country is a system that can not be used when moved to another country, there is a possibility of preventing one universal wireless communication system from spreading internationally.

In the wireless local area network conforming to IEEE 802.11a in which an available frequency channel differs from country to country, an apparatus is shipped with settings in accordance with radio law or the like of a country in which it is used, and also there is a problem that the apparatus can not be used in a country other than the corresponding country and it has been necessary for a user to tolerate a disadvantage such as restrictions on usage in a country other than the specified country.

Further, since a conventional mobile wireless terminal apparatus employs a method of scanning all frequency bandwidths available to the wireless communication system thereof and selecting a usable communication system, there has been a problem that a appropriate operation of the wireless communication system can not be set unless the usable communication system exists in the vicinity thereof.

In other words, in order to detect a signal modulated by the same signal type, art such as an international roaming service of a cellular system has been disclosed, in which scanning is performed over the range of frequency bands used in all countries to identify a country based on a detected frequency band or a predetermined signal, and to use only in the frequency bandwidth of the country; however there still remains a problem that a mobile terminal apparatus can not perform an operation at all when it is outside a reaching range of a radio wave transmitted from a base station of the wireless communication system thereof.

Accordingly, it is an object of the present invention to provide a wireless communication apparatus, in which a frequency band, a signal type, and a transmission output power in accordance with radio law of a country where a first wireless communication system is used are set by means of a receiving status of a specific signal in a second wireless communication system so that the apparatus can be operated without bothering a user.

Further, it is an object of the present invention to provide a wireless communication system which controls, by means of a specific signal in the second wireless communication system, a frequency bandwidth, a signal type, a transmission output power, and the like of the first wireless communication system in an area where it is necessary to particularly restrict an operation of the first wireless communication system.

SUMMARY OF THE INVENTION

In order to solve the above-described problems and to achieve the purpose of the present invention, the wireless communication system according to the present invention includes: an area information acquisition unit which first acquires information on an area in which wireless communication system presently exists, an area information judging unit which judges the communication setting information set in the wireless communication system by means of the area information acquired by the area information acquisition unit based on communication setting information stored in a memory unit in the wireless communication system which corresponds to area information, and further, a communication control unit which controls communication settings in the wireless communication system based on the communication setting information judged by the area information judging unit.

The wireless communication system according to the present invention is a first wireless communication system in which a usable frequency band and signal type differ from country to country, wherein a wireless communication apparatus of the first wireless communication system includes a unit for recognizing the present position thereof in order to perform information transmission in a frequency band, a signal type, and a transmission output power which conform to radio law of the country.

Further, as a unit for recognizing the position thereof, position information acquired by GPS (Global Positioning System) receiving system is used or downward control information from a second wireless communication system which is, for example, a base station of a cellular wireless telephone system is received; and corresponding country identification code or area identification code is distinguished to set a frequency band and a signal type required for the transmission of information on the first wireless communication system from a list of frequency band, signal type, and transmission output power conforming to radio law of the country and the communication is performed in a set state.

Further, as another unit for recognizing the position, a beacon signal is received at an access point of a wireless LAN (Local Area Network) system from the second wireless communication system, and corresponding country identification code or area identification code is distinguished to set a frequency band and a signal type required for the transmission of information on the first wireless communication system from a list of frequency band, signal type, and transmission output power conforming to radio law of the country and the communication is performed in a set state.

Since a wireless communication apparatus in a wireless communication system receives a predetermined signal in the second wireless communication system and a present position thereof is recognized from the signal; and since the apparatus performs information transmission in the first wireless communication system with settings at least one parameter among the frequency band, the signal type, the transmission output power, and usable time which conform to radio law of the corresponding country, the base station of the second wireless communication system need not recognize an operation of the first wireless communication system, so that the wireless communication can be performed without bothering a user by setting the frequency band, the signal type, and the transmission output power which conform to radio law of the country where the first wireless communication system is used by means of a receiving status of a specific signal in the second wireless communication system. Moreover, in an area where the operation of the first wireless communication system particularly requires to be restricted, the frequency band, the signal type, the transmission output power, and the like of the first wireless communication system which can be used by the first wireless communication system is controlled by the specific signal in the second wireless communication system; and the operation of the first wireless communication system can be defined.

BRIEF DESCRIPTION OF THE DRAWINGS

FIGS. 8A to 8C are diagrams showing examples of 5 GHz band frequency in respective countries, in which FIG. 8A is of Europe, FIG. 8B is of USA and FIG. 8C is of Japan;

FIGS. 10A to 10D are diagrams showing examples of a super frame structure of the ad hoc network, in which FIG. 10A is a super frame period (SF1) of a wireless communication apparatus 91, FIG. 10B is a super frame period (SF2) of a communication apparatus 92, FIG. 10C is a super frame period (SF3) of a communication apparatus 93, and FIG. 10D is a super frame period (SF4) of a communication apparatus 94;

FIG. 19 is a diagram showing an example of a parameter table structure in the first wireless communication system.

DESCRIPTION OF THE PREFERRED EMBODIMENTS

Hereinafter, embodiments of the present invention will be described in detail referring to accompanied drawings.

Figure 1:
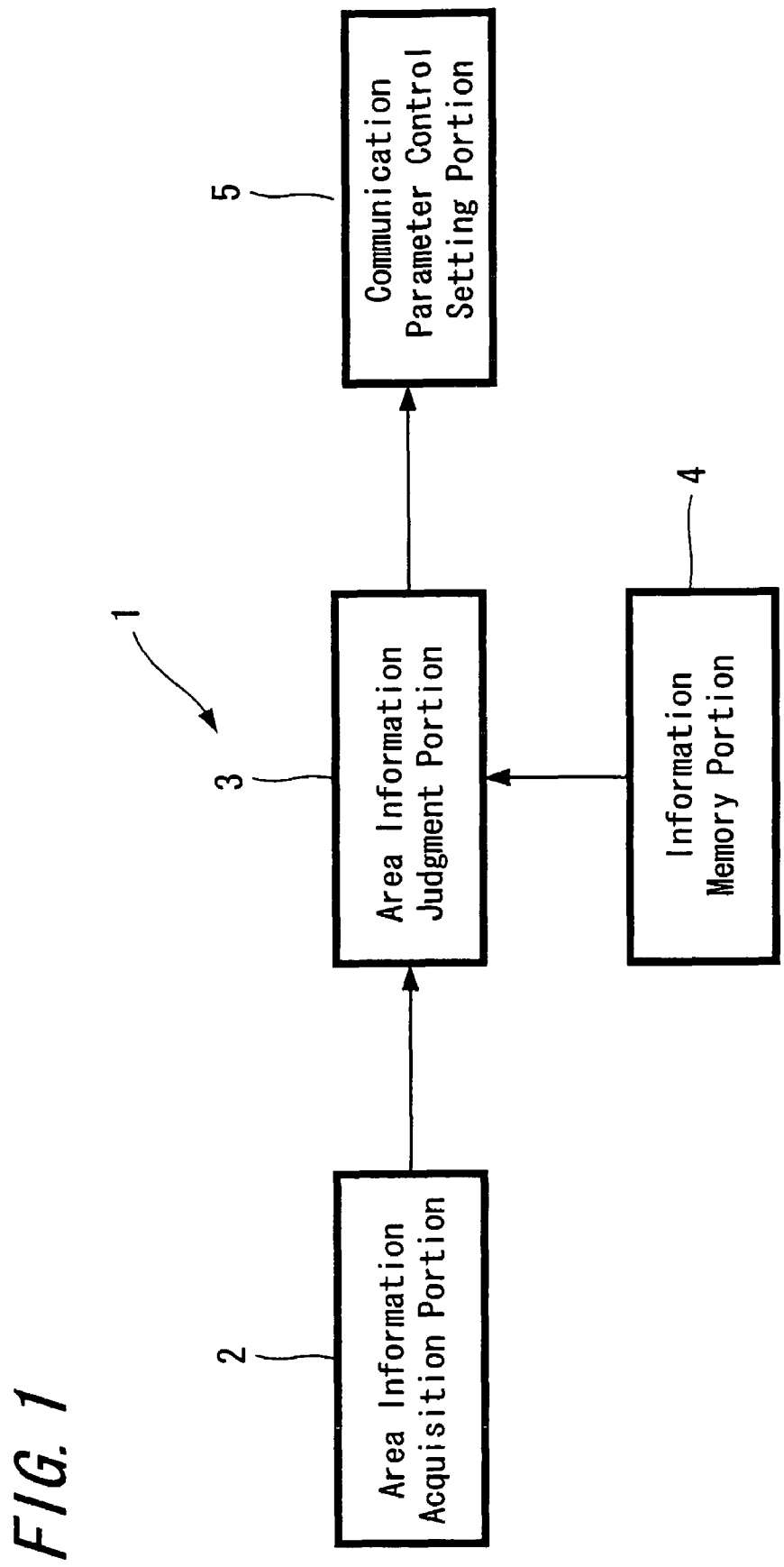
FIG. 1 is a block diagram of a wireless communication system applied to an embodiment of the present invention.

FIG. 1 shows a configuration of a wireless communication system applied to an embodiment of the present invention. A wireless communication system 1 shown in FIG. 1 constitutes a first wireless communication system and has a construction, with which wireless communication can be performed between a second wireless communication system.

In FIG. 1, the wireless communication system 1 includes: an area information acquisition portion 2 for acquiring information on an area in which this wireless communication system exists at present, an information memory portion 4 for storing communication setting information corresponding to the area information in this wireless communication system, an area information judgment portion 3 for judging the communication setting information which can be set in this wireless communication system based on the area information acquired by the area information acquisition portion 2, and a communication parameter control setting portion 5 for controlling the communication settings in this wireless communication system based on the communication setting information judged by the area information judging portion 3.

In this wireless communication system 1, first, information on an area in which at present the wireless communication system exists is acquired by the area information acquisition portion 2. This wireless communication system 1 constitutes the first wireless communication system in which a usable frequency band and a signal type differ from country to country and the area information acquisition portion 2 recognizes a present position where the wireless communication apparatus of the first wireless communication system exists.

In accordance with the communication setting information in the wireless communication system stored in the information memory portion 4 corresponding to the area information, the area information judgment portion 3 judges based on the area information acquired by the area information acquisition portion 2 so that the communication setting information available for setting can be specified in this wireless communication system 1. The area information judgment portion 3 specifies the communication setting information in order to perform information transmission in a frequency band, a signal type, and a transmission output power which conform to radio law of the country thereof.

Further, the communication parameter control setting portion 5 controls the communication settings in the wireless communication system 1 based on the communication setting information judged by the area information judgment portion 3. The communication parameter control setting portion 5 controls operations so that the frequency band and signal type required to perform information transmission in the first wireless communication system are set from a table of frequency bands, signal types, and transmission output power which conform to the radio law of the country, and communication can be performed in the set state by a communication portion not shown in the drawing.

A wide band wireless system explained herein is a communication system which is applied to the UWB communication method.

Figure 8:
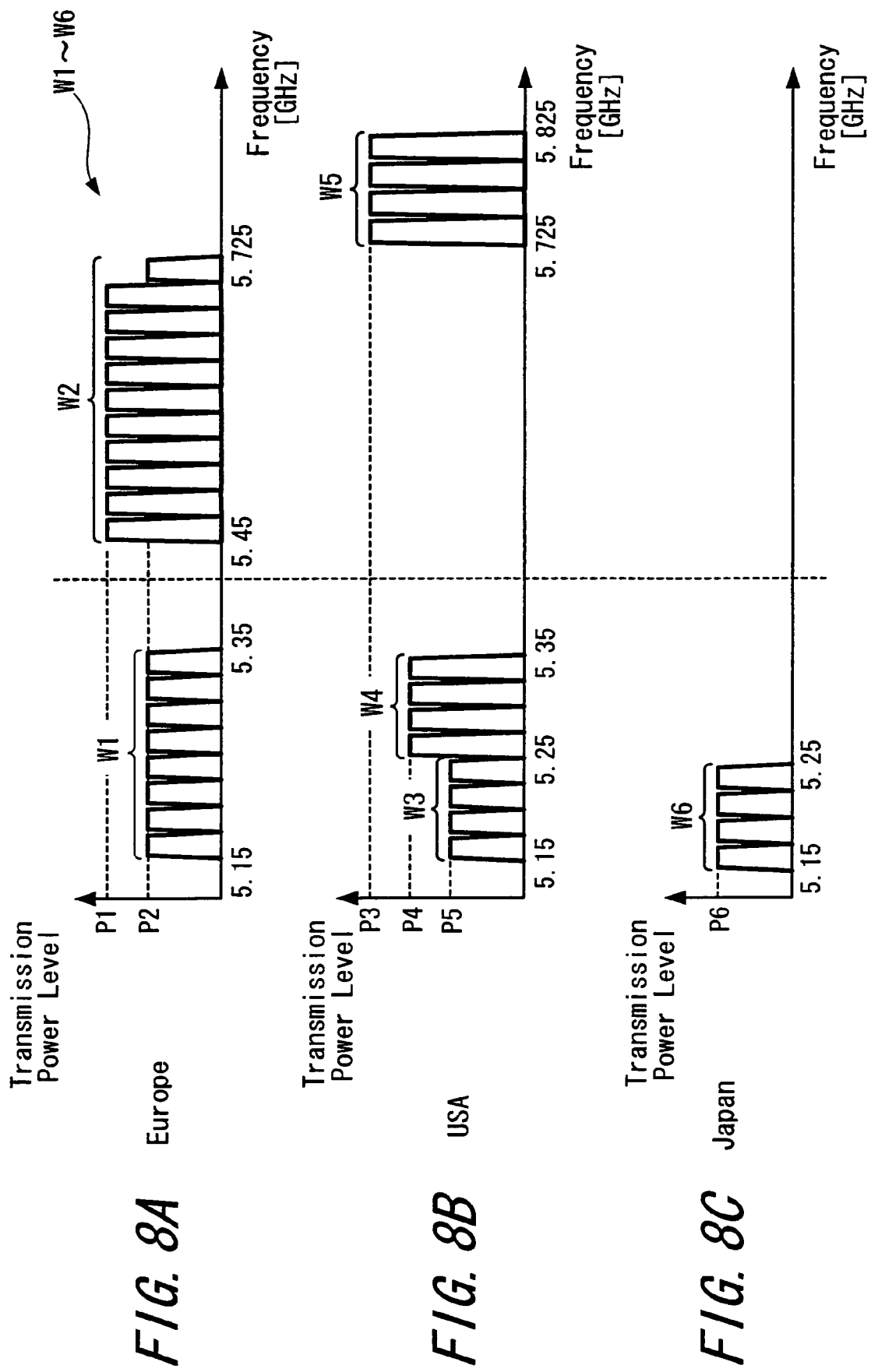

FIGS. 8A to 8C are diagrams showing the status of usage of 5 GHz frequency band in each country at the beginning of year 2002, in which FIG. 8A is of Europe, FIG. 8B is of USA, and FIG. 8C is of Japan.

In Europe as shown in FIG. 8A, a band W1 of 5.15 GHz to 5.35 GHz having a transmission power level P2 and a band W2 of 5.45 GHz to 5.725 GHz having a transmission power level P1 are being used.

In USA as shown in FIG. 8B, a band W3 of 5.15 GHz to 5.25 GHz having a transmission power level P5, a band W4 of 5.25 GHz to 5.35 GHz having a transmission power level P4 and a band W5 of 5.725 GHz to 5.825 GHz having a transmission power level P3 are being used.

In Japan as shown in FIG. 8C, a band W6 of 5.15 GHz to 5.25 GHz having a transmission power level P6 is being used.

As described above, it is observed that respective frequency bands used in Japan, USA, and Europe are slightly different. Although the above examples are of 5 GHz band, the same description can be made regarding any frequency band and there is a frequency band being used, while it is natural that there also exists a frequency band not being used.

Meanwhile, in case of a wide band communication apparatus, it is desirable to eliminate a frequency band of another apparatus by means of a band-pass filter on the receiving side. It is for the purpose of preventing an LNA from being saturated. However, if a range of elimination is widened indiscreetly, the receiving performance becomes deteriorated as the result. It is desirable to restrict the range of elimination as narrow as possible.

For example, in case that the UWB communication method becomes widespread and is incorporated into a note type personal computer (hereinafter referred to as a note PC), there occurs such a problem that frequency components which fall into the above described interfered frequency bands of W1 to W6 can not be eliminated well on traveling round the world with carrying the note PC, because frequencies used in other systems differ from country to country. Therefore, according to the embodiments of the present invention, the frequency components which fall into the above described interfered frequency bands of W1 to W6 can be eliminated properly by means of configurations and operations explained hereunder.

Figure 2:
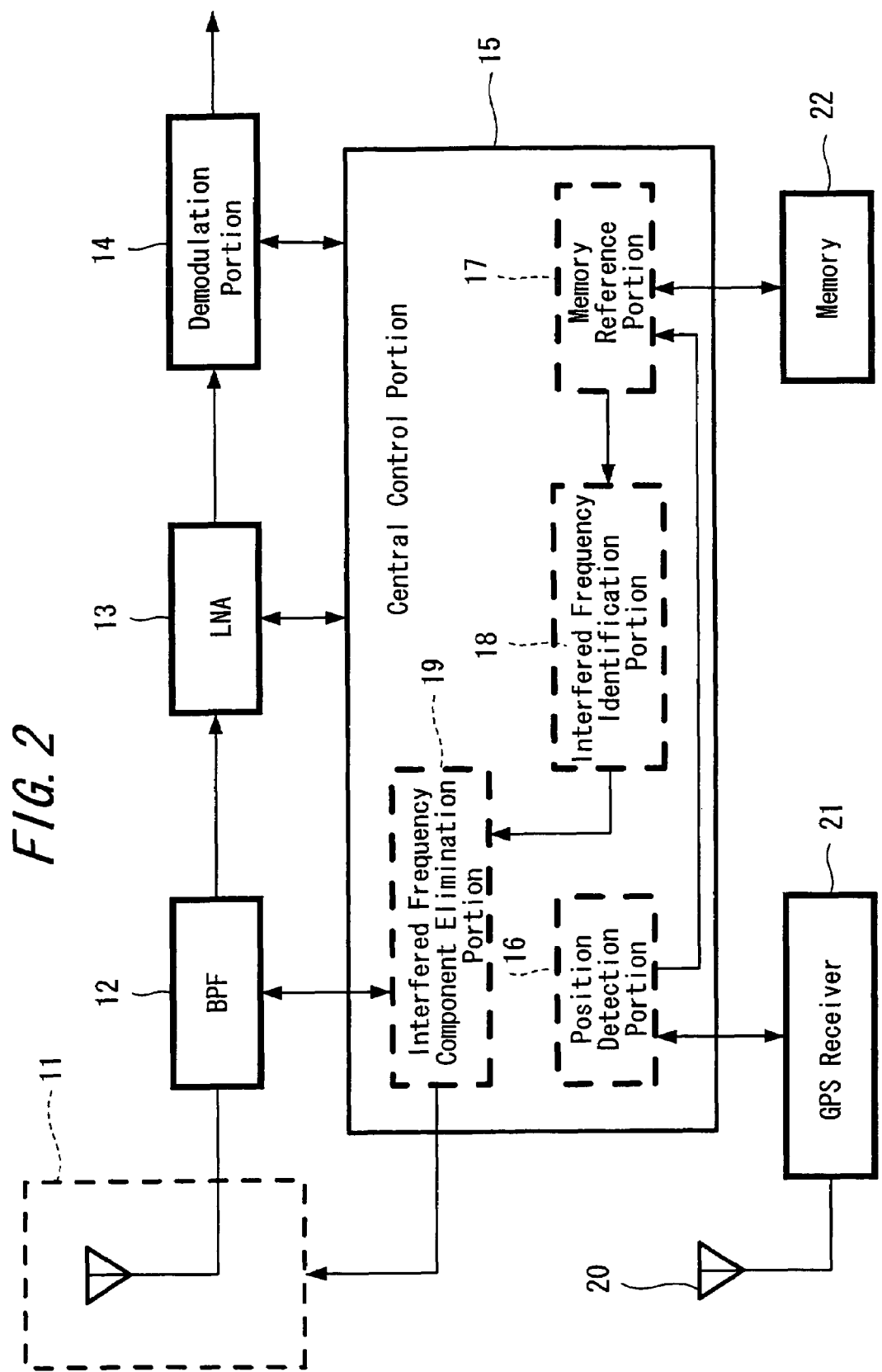
FIG. 2 is a block diagram showing a configuration of a receiver applied to the embodiment.

FIG. 2 is a block diagram showing a configuration of a receiver of the UWB system which is applied to the first embodiment of the present invention.

In FIG. 2, UWB signals are received from an antenna 11, unnecessary frequency components are eliminated by a BPF 12, and after the signals are amplified by a LNA 13, the signals are decoded by a demodulation portion 14. These operations are controlled by a central control portion 15.

Meanwhile, a GPS receiver 21 is built in the receiver of the first embodiment of the present invention, GPS signals are received from an antenna 20, position information is detected by the GPS receiver 21 and the detected information is sent to a memory 22. In the memory 22, position information and corresponding frequency band information of interfered frequency bands which should be eliminated have been stored. In accordance with the information, the central control portion 15 controls, for example, the BPF 12 to eliminate frequency bands of other system interfering with the UWB receiver.

In this case, the antenna 11 constitutes a receiving unit for receiving signals transmitted with transmission power from another wireless communication apparatus to output received signals; the LNA 13 constitutes a signal processing unit for performing signal processing on the received signal output from the antenna 11; the GPS receiver 21 constitutes a position detecting unit for detecting a position of the wireless communication apparatus; and the memory 22 constitutes a memory unit for storing interfered frequency bands which are communication frequency bands higher than transmission power having a transmission power level which affects signal processing function of the LNA 13 in accordance with a position of the wireless communication apparatus.

More specifically, the central control portion 15 includes: a position detection portion 16 which detects the position information by the GPS receiver 21 and takes in the detected information and a memory reference portion 17 which refers to the interfered frequency bands stored in the memory 22 in accordance with the position information detected and taken in by the position detection portion 16.

The central control portion 15 further includes: an interfered frequency band identification portion 18 which identifies an interfered frequency band for the wireless communication apparatus itself from the interfered frequency bands stored in the memory 22 in accordance with the position information detected by the GPS receiver 21 and an interfered frequency component elimination control portion 19 which controls operation such that an interfered frequency component identified by the interfered frequency band identification portion 18 can be eliminated from the received signal; and the central control portion 15 eliminates such interfered frequency band that affects the signal processing function of the LNA 13 using the position information of its own wireless communication apparatus, when wireless communication is performed using a bandwidth which includes other communication frequency bands.

Herein, the position detection portion 16 and the memory reference portion 17 shown in FIG. 2 correspond to the area information acquisition portion 2 shown in FIG. 1, the interfered frequency band identification portion 18 shown in FIG. 2 corresponds to the area information judgment portion 2 shown in FIG. 1, the memory 22 shown in FIG. 2 corresponds to the information memory portion 4 shown in FIG. 1, and the interfered frequency component elimination control portion 19 shown in FIG. 2 corresponds to the communication parameter control setting portion 5 shown in FIG. 1.

Figures 3, 4:
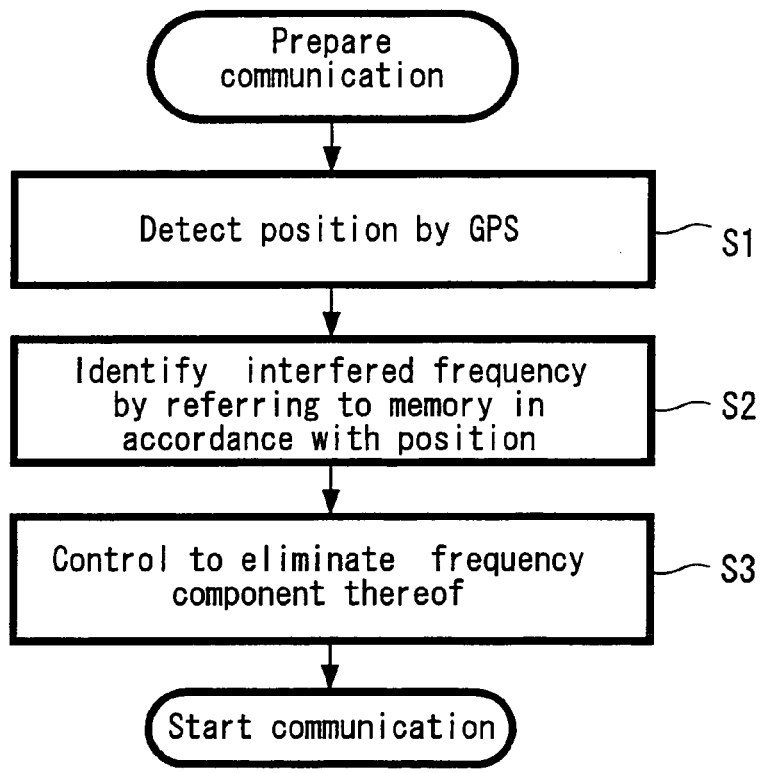
FIG. 3 is a table showing interfered frequency bands in respective countries stored in a memory.
FIG. 4 is a flow chart showing operations of detecting a position by means of GPS and eliminating an interfered frequency band.

FIG. 3 is an example of a table showing interfered frequency bands in respective countries which are to be stored in the memory 22.

Hereupon, the interfered frequency band identification portion 18 of the central control portion 15 identifies, for example, a country name 24 based on GPS information 23 that is the position information acquired from the GPS receiver 21, assigns interfering frequency bands 25 to be eliminated, and sends information on the interfering frequency bands 25 to be eliminated to the interfered frequency component elimination control portion 19 of the central control portion 15.

The interfered frequency component elimination control portion 19 of the central control portion 15 controls the BPF 12 based upon the information on the interfering frequency bands 25 which should be eliminated. Although a control method for the BPF 12 depends on its actual mounting arrangement, specific examples are listed hereunder.

As a premise, it is assumed that the BPF 12 is a notch filter to eliminate a narrow bandwidth jamming wave on the receiving side.

With respect to analog filters, methods such as those described below can be considered roughly.

First, a plurality of notch filter banks are aligned and they are switched ON or OFF by turning thereof.

Secondly, the notch filter is composed of a coil L and a condenser C, and a bandwidth is made variable by controlling the coil L or the condenser C with voltage or the like.

Thirdly, a notch filter by means of a mechanical resonator is provided and its central frequency is shifted by a resonance condition changing unit.

Further, not limited to the control over the BPF 12 but bandwidth restriction may be carried out for the antenna 11 as mentioned hereunder.

Fourthly, the antenna 11 is composed such that frequency characteristics are changeable and the changeover is carried out.

Fifthly, as the antenna 11, an adaptive array antenna capable of changing applicable frequency bandwidths is used.

The fourth and fifth described above are control methods over the antenna 11 other than the BPF 12, and are applied examples of the embodiment.

For example, in case of the fourth method, it is possible to make a notch by inserting a cut-out such as a slot to a patch system antenna or the like. It is possible to make frequency characteristics variable by having electrodes partially turned on or off by means of a diode switch (diode SW) or the like. With respect to the fifth method, the adaptive array antenna capable of changing over applicable frequency bandwidths eliminates unnecessary frequencies.

FIG. 4 is a flow chart showing position detecting operations by GPS to eliminate an interfered frequency band.

In FIG. 4, preparation is performed before performing communication. First, a position of a receiver which is a wireless device is detected by the GPS receiver 21 (step S1). Specifically, the GPS receiver 21 detects the position of the receiver through the antenna 20, and the position detection portion 16 of the central control portion 15 detects and takes in position information detected by the GPS receiver 21.

Secondly, a frequency band in the memory 22 which is predicted to cause interference is identified using the position information (step S2). Specifically, in accordance with the position information detected and taken in by the position detection portion 16, the memory reference portion 17 refers to interfered frequency bands stored in the memory 22, and in accordance with the position information detected by the GPS receiver 21, the interfered frequency band identification portion 18 identifies an interfered frequency band for its own wireless communication apparatus from the interfered frequency bands stored in the memory 22.

The central control portion 15 controls the BPF 12 or the antenna 11 to eliminate that frequency component based on the information thereof (step S3). Specifically, the interfered frequency component elimination control portion 19 controls the BPF 12 or the antenna 11 to eliminate the interfered frequency component identified by the interfered frequency band identification portion 18 from the received signal, so that when wireless communication is performed using a bandwidth which includes other communication frequency bands, such interfered frequency band that affects the signal processing function of the LNA 13 is eliminated by means of the position information of its own wireless communication apparatus.

Further, this control may be performed on the BPF 12 or it is also possible to have the antenna 11 carry out elimination of a frequency.

Figure 5:
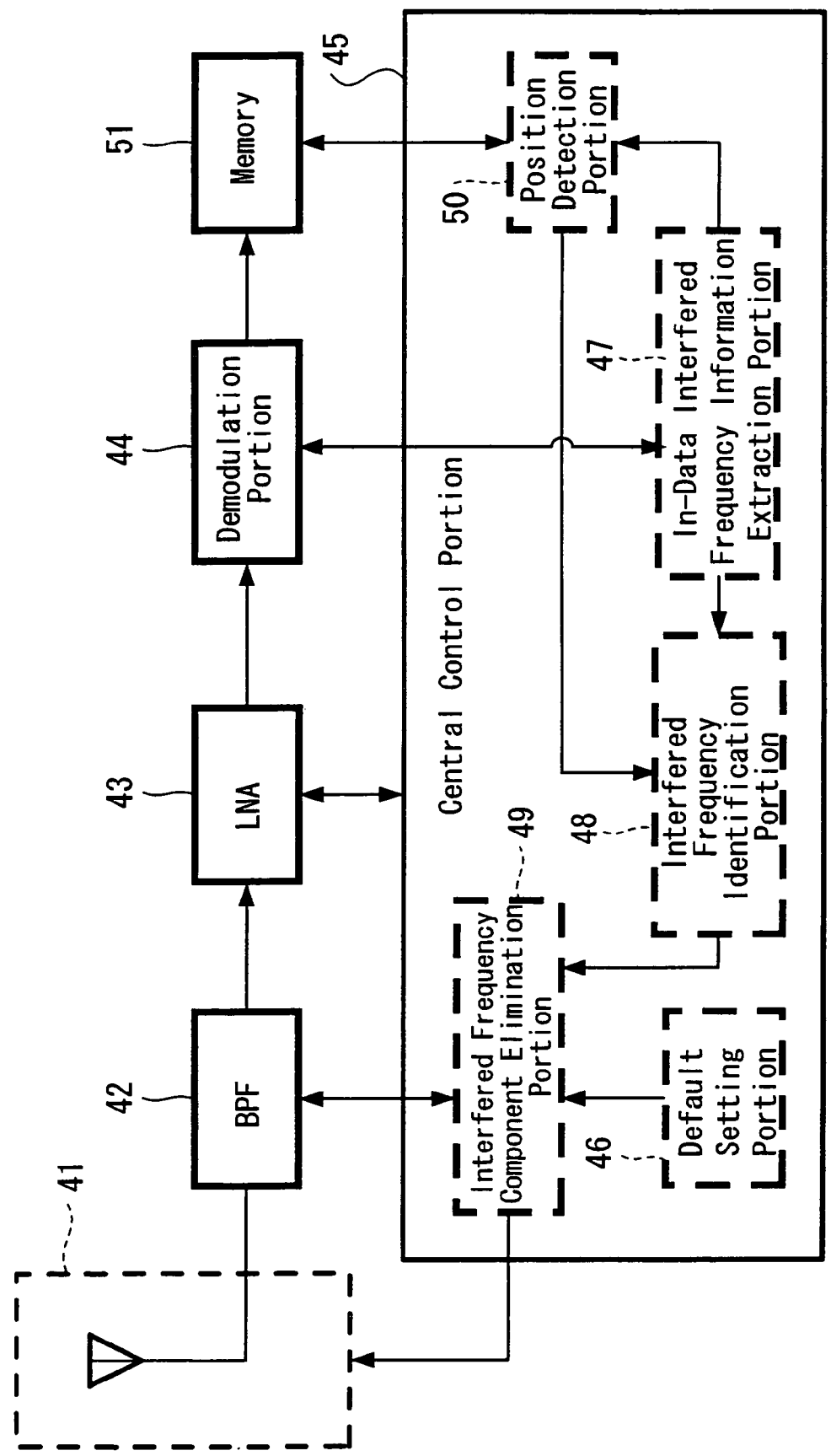
FIG. 5 is a block diagram showing a configuration of another receiver.

FIG. 5 is a block diagram showing a configuration of a receiver according to a second embodiment of the present invention.

In FIG. 5, a UWB signal is received from an antenna 41, an unnecessary frequency component is eliminated by a BPF 42, then the signal is amplified by a LNA 43, the signal is decoded by a demodulation portion 44, and the demodulated signal is supplied to a memory 51. These operations are controlled by a central control portion 45.

Figure 6:
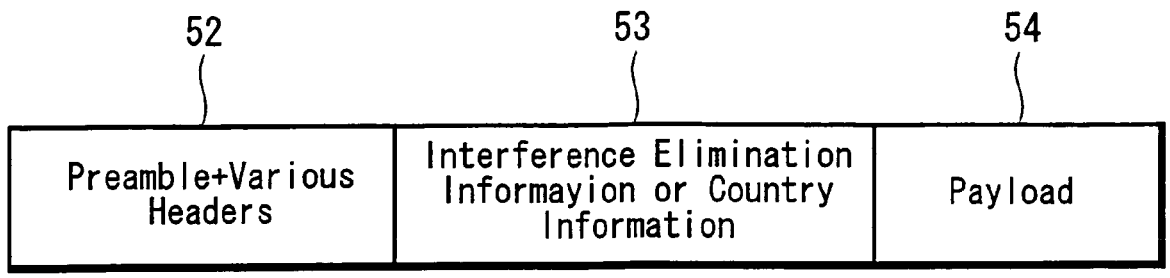
FIG. 6 is a diagram showing an example of a data format structure.

In the receiver shown in FIG. 5 according to the second embodiment of the present invention, country information and frequency information 53 which is predicted to receive interference are contained in a part of data format of a received signal as shown in FIG. 6 and based on the information 53, the central control portion 45 performs control so that the LNA 43 shall not be saturated. In FIG. 6, an preamble for synchronization and various header information sets are contained in a portion of reference numeral 52 and conventionally, there is a payload 54 in which communication data is contained. In the second embodiment of the present invention, interference elimination information or country information 53 is contained other than the above.

The above is similar to a local code which is adopted to a DVD (Digital Versatile Disc), game equipment, and the like, and information thereof differs depending on each area. With observing the information 53 contained in the data, similarly to the above described position information of the GPS, the central control portion 45 of the receiver judges which frequency band should be eliminated and controls the whole of the receiver.

In FIG. 5, a UWB signal is input from the antenna 41, an unnecessary frequency component which is set as default in the central control portion 45 is eliminated by the BPF 42, and after the signal is amplified by the LNA 43, the signal is decoded by the demodulation portion 44. These are controlled by the central control portion 45.

In this embodiment, the interference elimination information or the country information 53 in the received signal is extracted from the data format shown in FIG. 5 by the central control portion 45 and in accordance with an instruction thereof, the central control portion 45 again controls, for example, the BPF 42 or the antenna 41. In case that information on a frequency which should be eliminated is written directly, the BPF 42 is controlled so as to eliminate the frequency thereof, and in case that country information is written therein, the country information is once sent to the memory 51. Position information and corresponding information on frequency bands which should be eliminated are stored therein. In accordance with the information, the central control portion 45 controls, for example, the BPF 42 or the antenna 41 to eliminates a frequency band of another apparatus which causes interference with the UWB receiver.

Specifically, the central control portion 45 includes an interfered frequency information extraction portion 47 that extracts information on interfered frequencies corresponding to position information of its own wireless communication apparatus, which are communication frequency bands having a transmission power level higher than that affecting the signal processing function of the LNA 43, from data of an output signal which is output from the demodulation portion 44.

Further, the central control portion 45 includes an interfered frequency band identification portion 48 to identify, in accordance with the position information, an interfered frequency band for its own wireless communication apparatus from the interfered frequency bands extracted by the interfered frequency information extraction portion 47.

Further, the central control portion 45 includes a default setting portion 46 of initially setting an interfered frequency component corresponding to the position information of its own wireless communication apparatus, before an interfered frequency component is identified by the interfered frequency band identification portion 47.

Further, the central control portion 45 includes an interfered frequency component elimination control portion 49 to control operation such that the interfered frequency component which is initially set by the default setting portion 46 or the interfered frequency component which is identified by the interfered frequency band identification portion 47 can be eliminated from the received signal.

Further, the central control portion 45 is configured such that when wireless communication is performed using a bandwidth including other communication bands, the interfered frequency component elimination control portion 49 eliminates such interfered frequency band that affects the signal processing function of the LNA 43 using the interfered frequency component which is initially set or using the interfered frequency information contained in the data of the received signal.

Furthermore, the receiver is provided with the memory 51 storing the interfered frequency bands corresponding to the position information which are communication frequency bands having a transmission power level higher than that affecting the signal processing function of the LNA 43, and the central control portion 45 is configured such that an interfered frequency band for its own wireless communication apparatus is identified in accordance with the position information by the interfered frequency band identification portion 48 from the interfered frequency bands stored in the memory 51, when only position information is extracted from the information by the interfered frequency information extraction portion 47.

Figure 7:
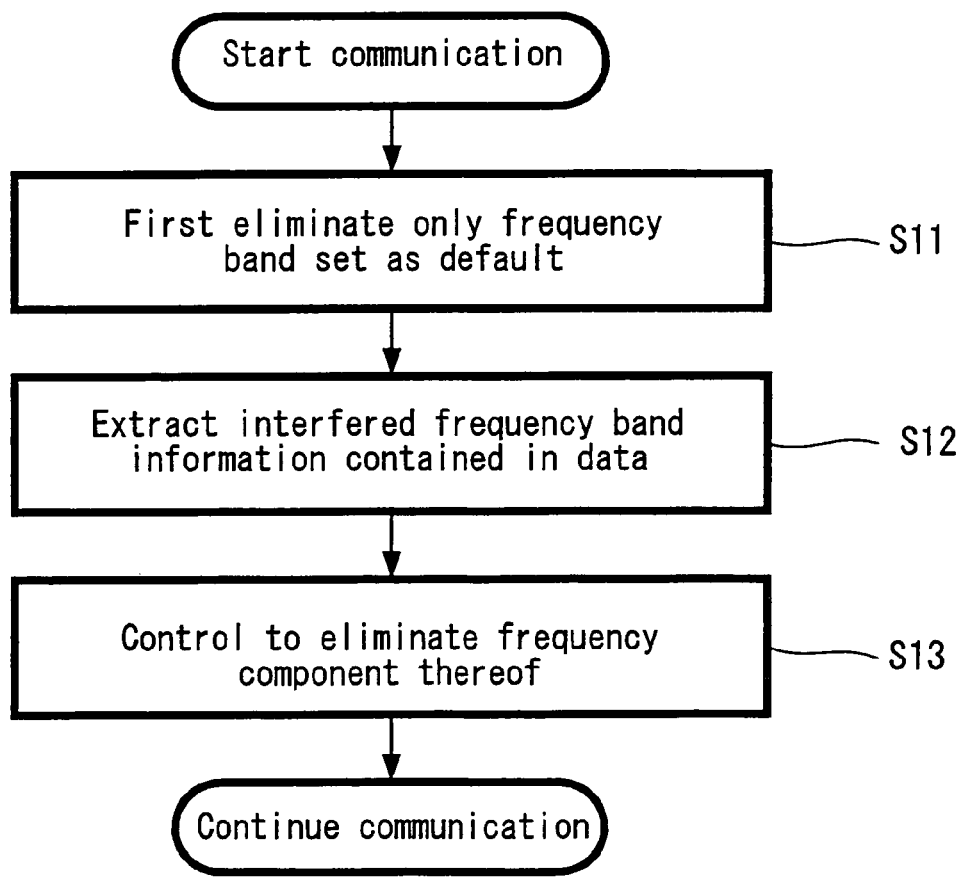
FIG. 7 is a flow chart showing an operation using position information contained in data.

FIG. 7 is a flow chart showing operations which use position information contained in data. FIG. 7 shows operations in which information on an interfering frequency component which should be eliminated is contained in the data.

In FIG. 7, when first starting communication, the communication is performed after eliminating only a frequency band which is set as default (step S11). That is to be a 2.4 GHz band or the like already determined worldwide in common. Specifically, the default setting portion 46 of the central control portion 45 initially sets an interfered frequency component corresponding to position information of its own wireless communication apparatus, before an interfered frequency component is identified by the interfered frequency band identification portion 47, and the interfered frequency component elimination control portion 49 controls the BPF 42 or the antenna 41 so that the interfered frequency component which is initially set by the default setting portion 46 can be eliminated from a received signal.

After the communication is started, information of interfering frequency bands contained in the data is extracted (step 12). Specifically, the interfered frequency information extraction portion 47 extracts information on interfered frequencies corresponding to the position information of its own wireless communication apparatus which are communication frequency bands having a transmission power level higher than that affecting the signal processing function of the LNA 43 from the data of the output signal which is output from the demodulation portion 44, and in accordance with the position information, the interfered frequency band identification portion 48 identifies an interfered frequency band for its own wireless communication apparatus from the interfered frequency bands which are extracted by the interfered frequency information extraction portion 47.

The central control portion controls operation so as to eliminate the frequency component thereof (step 13). Specifically, the interfered frequency component elimination control portion 49 controls the BPF 42 or the antenna 41 so that the interfered frequency component which is identified by the interfered frequency band identification portion 47 can be eliminated from a received signal, and when wireless communication is performed using a bandwidth including other communication frequency bands, the interfered frequency component elimination control portion 49 eliminates such interfered frequency band that affects the signal processing function of the LNA 43 by means of the interfered frequency component which is initially set or the interfered frequency information which is contained in the data of the received signal.

Furthermore, an embodiment is not limited to the above but also a BPF or an antenna may be controlled so that an interfered frequency component which is set arbitrarily can be eliminated from a received signal.

In this case, though not shown in the drawings, in a wireless communication system in which a receiving portion of the wireless communication apparatus has: an antenna to receive a transmitted signal transmitted by transmission power from another wireless communication apparatus and to output a received signal, an LNA to perform signal processing of the received signal output from the antenna, and a demodulation portion, a central control portion is provided with an arbitrarily setting portion for a user to set at his/her own discretion an interfered frequency band corresponding to a position of its own wireless communication apparatus which is a communication frequency band having a transmission power level higher than that affecting the signal processing function of the LNA and an interfered frequency component elimination control portion to control operation so that an interfered frequency component which is arbitrarily set by the arbitrarily setting portion can be eliminated from the received signal, and is configured so that such interfered frequency band that affects the signal processing function of the LNA can be eliminated using the interfered frequency information which is set arbitrarily, when wireless communication is performed using a bandwidth which including other communication frequency bands.

As heretofore described, a wide band communication system represented by the Ultra Wideband communication method has been actively developed. In this system, it is conventionally practiced to eliminate a frequency component in which another system exists by means of a band-pass filter or the like so that a LNA (Low Noise Amp) on the receiver side shall not be saturated. In this embodiment, a system in which this control is performed in real-time using position information of GPS (Global Positioning System) or the like is proposed.

First, using the position information from the GPS, a frequency band in the vicinity which may cause interference is predicted based on this information and an frequency component thereof is eliminated so that the LNA shall not be saturated in the receiver. As a method for the above, BPF control, antenna control, or adaptive array antenna control can be considered. Accordingly, it becomes possible to perform communication without being interfered even in a wide band communication apparatus such as the UWB.

As an applied example, there is shown a method in which an frequency band predicted to cause interference has been inserted in data and in accordance with an instruction thereof the frequency component is eliminated by performing similar control. In addition, it is also shown that a frequency band which should be eliminated is arbitrarily set by a user's arbitrary setting.

Further, in the above described embodiment, although an explanation is made to the receiver of the wireless apparatus which is applicable to wide band wireless communication by means of the UWB communication method, it is needless to say that the application is not limited to the above but also can be made to a receiver of a wireless apparatus applied to wireless communication in other methods such as IEEE 802.11 standard and wireless IEEE 1394 standard.

Accordingly, in a wide band communication system represented by, for example, the UWB communication method, when eliminating a frequency component in which another system exists is attempted using a band-pass filter or the like in order to prevent interference, it is possible in the present invention to perform real-time control so as to eliminate such interfered frequency band that affects a signal processing function of a signal processing unit using position information from, for example, the GPS (Global Positioning System) or the like as a position detecting unit, and at this time, for example, the position detecting unit such as the GPS for detecting a position is incorporated, the band pass-filter capable of controlling, for example, a bandwidth-limiting frequency, and a memory as a memory unit in which bandwidth-limiting frequency control information corresponding to the position are incorporated in the communication apparatus; and the band-pass filter is controlled in accordance with the position so as to eliminate such interfered frequency band that affects the signal processing function of the signal processing unit.

Figure 9:
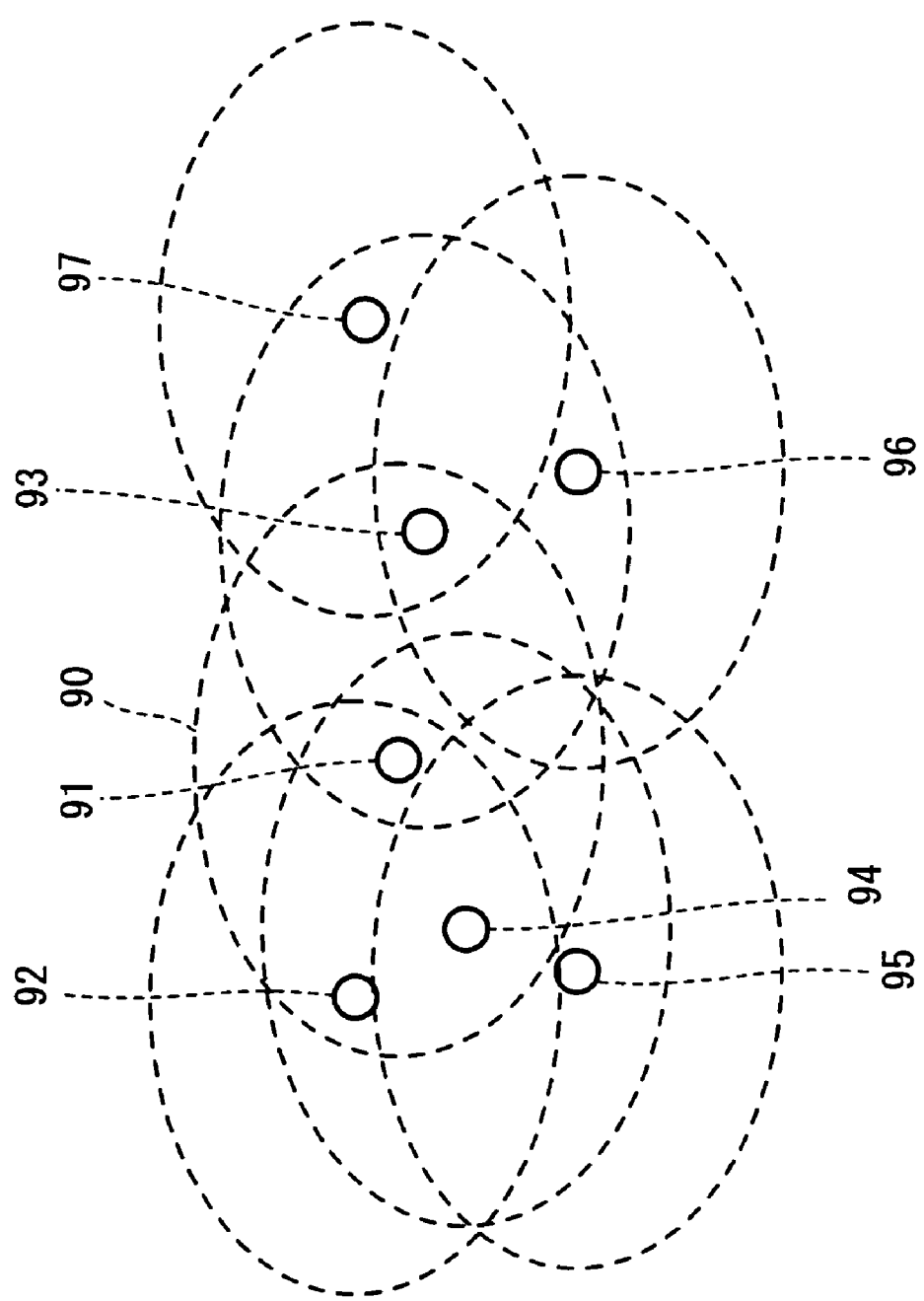
FIG. 9 is a constitutional diagram showing an ad hoc network.

FIG. 9 shows an example of an ad hoc network configuration according to another embodiment of the present invention.

In this ad hoc network, a plurality of wireless communication apparatuses such as communication apparatuses 91 to 97 shown in the drawing are disposed in space such that direct communication can be performed between communication apparatuses existing in the vicinity. The ad hoc network is a self-dispersion type network and has neither a control station nor an access point.

Hereupon, the communication apparatus 91 can perform direct communication with the communication apparatuses 92, 93 and 94 existing in the vicinity thereof within a reaching range 90 of its radio wave (inside an ellipsoid of dashed line having the apparatus 91 on its a center); however the communication apparatus 91 can not perform direct communication with the communication apparatuses 95, 96, and 97 which exist outside the range thereof.

Further, similarly, the communication apparatus 92 can perform direct communication with the communication apparatuses 91 and 94 existing in the vicinity thereof but can not perform direct communication with the other communication apparatuses 93, 95, 96, and 97. Also similarly, the communication apparatus 93 can perform direct communication with the communication apparatuses 91, 96, and 97 existing in the vicinity thereof but can not perform direct communication with the other communication apparatuses 92, 94, and 95. Also similarly, the communication apparatus 94 can perform direct communication with the communication apparatuses 91, 92, and 95 existing in the vicinity thereof but can not perform direct communication with the other communication apparatuses 93, 96, and 97.

In addition, the communication apparatus 95 can perform direct communication only with the communication apparatus 94 similarly existing in the vicinity thereof but can not perform direct communication with the other communication apparatuses 91, 92, 93, 96, and 97. Also, the communication apparatus 96 can perform direct communication only with the communication apparatus 93 similarly existing in the vicinity thereof but can not perform direct communication with the other communication apparatuses 91, 92, 94, 95, and 97. Also, the communication apparatus 97 can perform direct communication only with the communication apparatus 93 similarly existing in the vicinity thereof but can not perform direct communication with the other communication apparatuses 91, 92, 94, 95, and 96.

Figure 10:
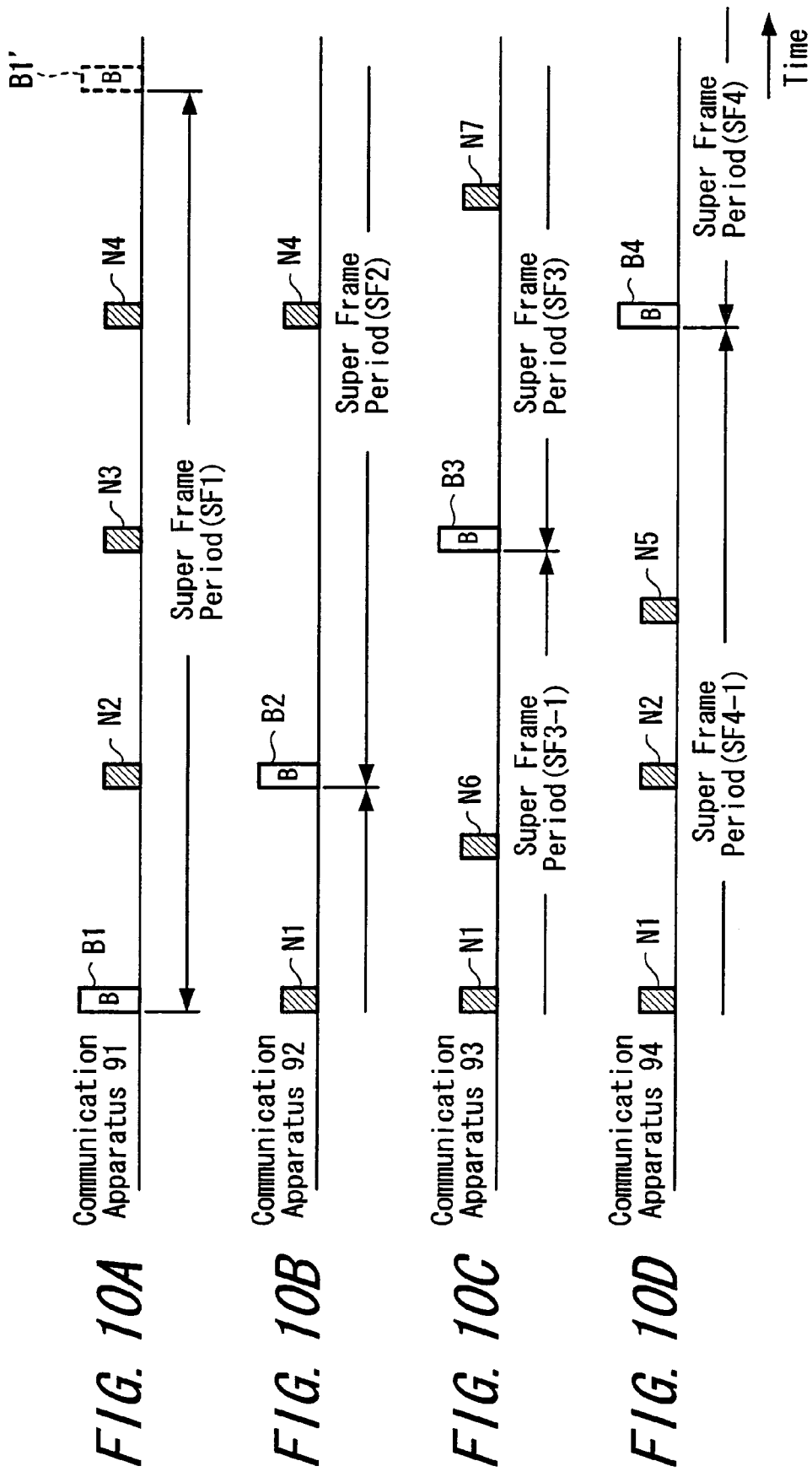

FIG. 10 shows an example of super frame structure of the ad hoc network according to another embodiment of the present invention.

In this super frame structure, the super frame is defined by transmission of periodic beacon signals at predetermined time intervals.

Further, with respect to this super frame, each of the wireless communication apparatuses 91 to 97 independently sets the super frame structure and its start timing is set so as not to overlap with the super frame structure of the other wireless communication apparatuses existing in the vicinity.

That is, the wireless communication apparatus 91 in FIG. 10A receives beacon signals (N2, N3, and N4) from the respective communication apparatuses 92, 93, and 94 existing in the vicinity thereof, transmits a beacon signal (B1) of its own at the timing not overlapped with those beacon signals, and sets a period of the transmission timing of next beacon signal (B1') as its own super frame period (SF1).

Similarly, the communication apparatus 92 in FIG. 10B can receive beacon signals (N1 and N4) from the respective communication apparatuses 91 and 94 existing in the vicinity thereof and performs settings of its own super frame period (SF2) in the same manner as described above, the communication apparatus 93 in FIG. 10C can receive beacon signals (N1, N6, and N7) from the respective communication apparatuses 91, 96, and 97 existing in the vicinity thereof and similarly performs settings of its own super frame period (SF3), and the communication apparatus 94 in FIG. 10D can receive beacon signals (N1, N2, and N5) from the respective communication apparatuses 91, 92, and 95 existing in the vicinity thereof and similarly performs settings of its own super frame period (SF4).

Figure 11:
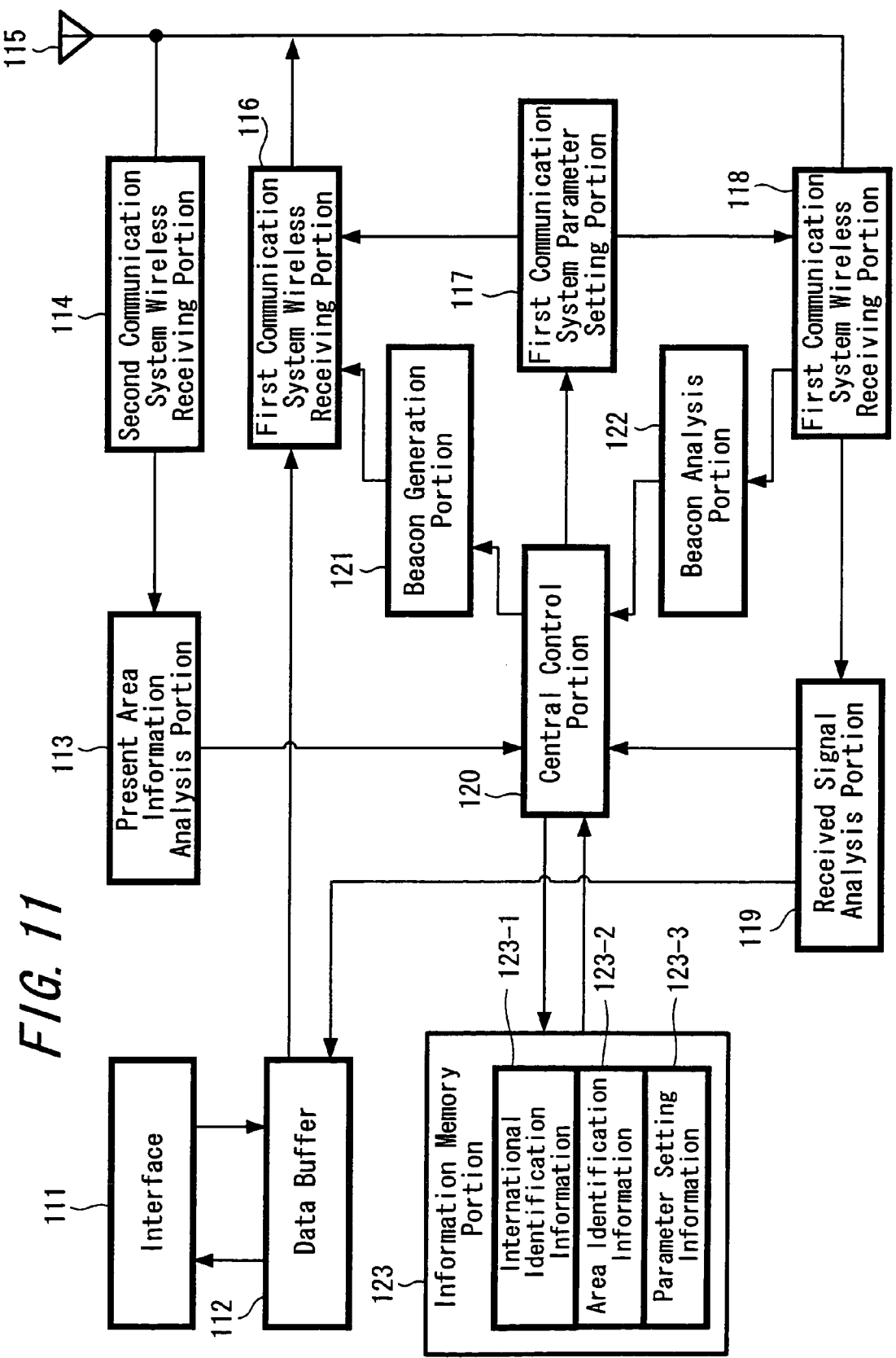
FIG. 11 is a block diagram showing an example of a configuration of a wireless communication apparatus according to another embodiment of the present invention.

FIG. 11 is a diagram showing an example of a configuration of a wireless communication apparatus according to another embodiment of the present invention.

This wireless communication apparatus is provided with: an interface 111 for receiving and transmitting information from/to a device which performs an application; a data buffer 112 for storing data from the application and data transmitted from another communication apparatus; further, a present area information analysis portion 113 for judging a position by means of a signal of a second communication system, which is a specific aspect of the another embodiment of the present invention; a second communication system wireless receiving portion 114 which is provided in order to receive a downward control signal of the second communication system; an antenna 115 for transmitting a signal to which modulation processing is performed or for receiving a signal from another communication apparatus; and a first communication system wireless transmission portion 116 for converting stored data to a predetermined format and performing the modulation processing.

In addition, this wireless communication apparatus includes: a first communication system parameter setting portion 117 for setting a parameter of the first communication system from a present position; a first communication system wireless receiving portion 118 for demodulating a signal from another communication apparatus and extracting predetermined data information; a received signal analysis portion 119 for analyzing the extracted data information whether it is user data or control information; a central control portion 120 for instructing all operations of this wireless communication apparatus using predetermined execution commands and supervising a state of the all operations; a beacon generation portion 121 for generating beacon information to be transmitted so as to give a notice that the first communication system is in a state of operation; a beacon analysis portion 122 for extracting and analyzing a beacon signal, which is transmitted from a communication apparatus existing in the vicinity, from a received signal; and an information memory portion 123 for storing parameter setting information linked with a series of control programs, international identification information, or area identification information. The information memory portion 123 contains international identification information 123-1, area identification information 123-2, and parameter setting information 123-3, for example. Hereupon, the present area information analysis portion 113 shown in FIG. 11 corresponds to the area information acquisition portion 2 shown in FIG. 1, the central control portion 120 shown in FIG. 11 corresponds to the area information judgment portion 3 shown in FIG. 1, the information memory portion 123 shown in FIG. 11 corresponds to the information memory portion 4 shown in FIG. 1, and the first communication system parameter setting portion 117 shown in FIG. 11 corresponds to the communication parameter control setting portion 5 shown in FIG. 1.

Figure 12:
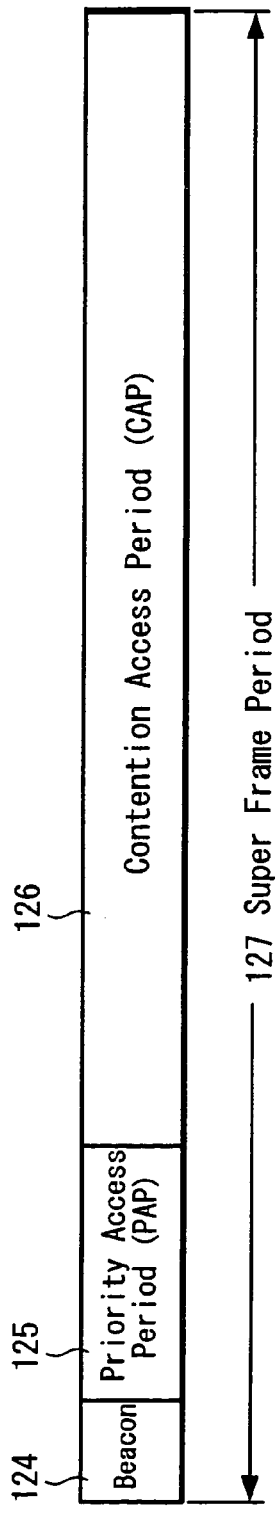
FIG. 12 is a diagram showing an example of a communication area structure inside a super frame in a first wireless communication system.

FIG. 12 is a diagram showing an example of a communication area structure within a super frame in the first wireless communication system.

In this super frame period 127, a starting point (timing) of the super frame is defined by a beacon signal 124 (Beacon) that is repeatedly transmitted approximately periodically. Further, subsequent to this beacon signal 124 a priority access period 125 is set, in which a signal from itself is preferentially transmitted or a specific signal is received from another apparatus during predetermined time. Then, after the priority access period of the predetermined time is passed, a contention access period 126 is set to be used arbitrary.

Figure 13:
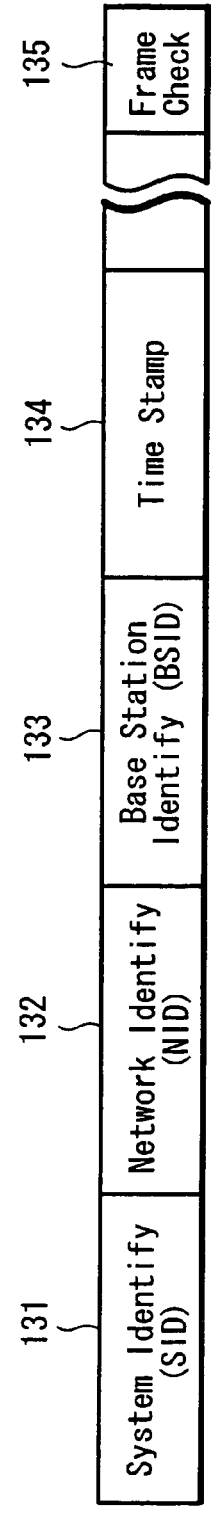
FIG. 13 is a diagram showing an example of information structure of a downward control signal in a second wireless communication system.

FIG. 13 is an example of information structure of a downward control signal in the second wireless communication system.

Hereupon, explanations will be given only to a part that is used for an explanation of another embodiment of the present invention. Structural components of this downward control signal includes: an SID (System Identify) 131 to which one value is set, for example, per country, an NID (Network Identify) 132 which is set, for example, per predetermined geographical boundary or per operator, further, a BSID (Base Station Identify) 133 which is set for each base station, a time stamp 134 which is information on the time when this signal is transmitted, a frame check 135 which is a predetermined error correction code or an error correction code, and the like.

Figure 14:
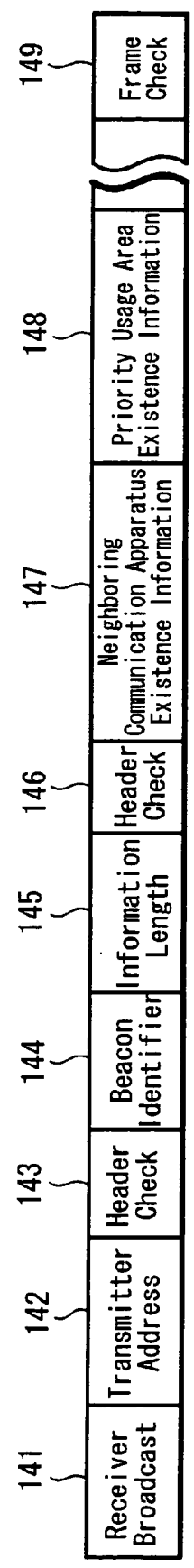
FIG. 14 is a diagram showing an example of frame structure of a beacon signal in the first wireless communication system.

FIG. 14 is an example of frame structure of a beacon signal in the first wireless communication system.

Hereupon, it is assumed that the beacon signal is to be transmitted by broadcasting to an receiver address of this signal (Receiver Address Broadcast 141) and an address of a transmitter is set as its own address (Address 142). Further, the beacon signal is composed of: a header check 143 to detect an error thereof; a beacon identifier 144 to identify a beacon signal; an information length 145 to indicate an information length of this signal; further, a header check 146 to detect an error up to this portion; neighboring communication apparatus existence information 147 to indicate the timing of transmitting a beacon signal of a communication apparatus existing in the vicinity; furthermore, priority usage area existence information 148 to indicate whether or not there is setting of a priority usage area according to the another embodiment of the present invention; and the like; and is composed of a frame check (Frame Check) 149 added at the end to perform error detection of this frame.

Also, the beacon signal may include another information in addition to the information described herein, if it is necessary.

Figure 15:
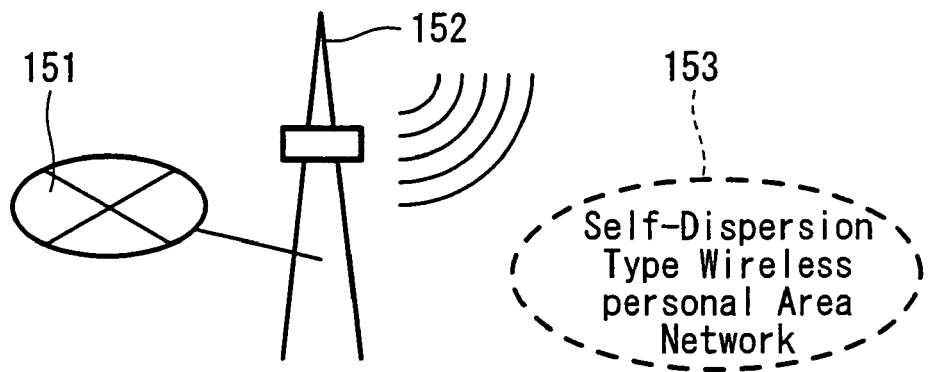
FIG. 15 is a diagram showing an example of a configuration of a cellular communication network and a self-dispersion type network.

FIG. 15 is a diagram showing an example of a configuration of a cellular communication network and a self-dispersion type network as an outline of a wireless communication system according to another embodiment of the present invention.

Hereupon, this drawing schematically shows the operation in which when a wireless personal area network 153 is operated as a self-dispersion type ad hoc network that is the first wireless communication system, a signal from a base station 152 of a wireless communication system of a cellular communication network 151 that is the second wireless communication system is received and a frequency band, a signal type, a transmission output power, and the like which can be used in the area thereof are set.

Figure 16:
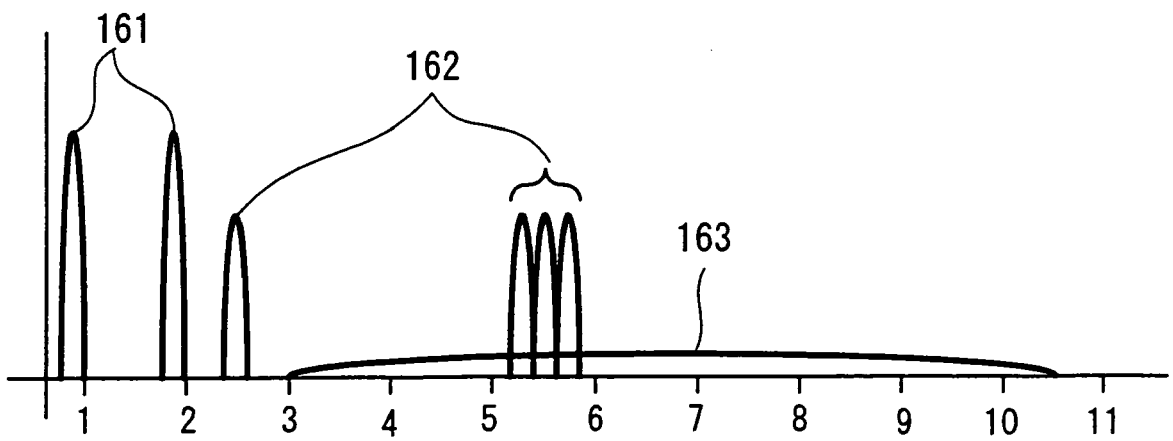
FIG. 16 is a diagram showing a distribution of a plurality of wireless communication systems by means of frequency bandwidths.

FIG. 16 is a diagram showing a distribution of a plurality of wireless communication systems by means of frequency bandwidths.

In this figure, a cellular communication system 161 exists in 900 MHz band and 1.9 GHz band, a wireless LAN communication system 162 exists in 2.4 GHz band and 5 GHz band, and a Ultra Wideband wireless communication system 163 exists over a ultra-wide band from 3.1 GHz to 10.6 GHz.

Figure 17:
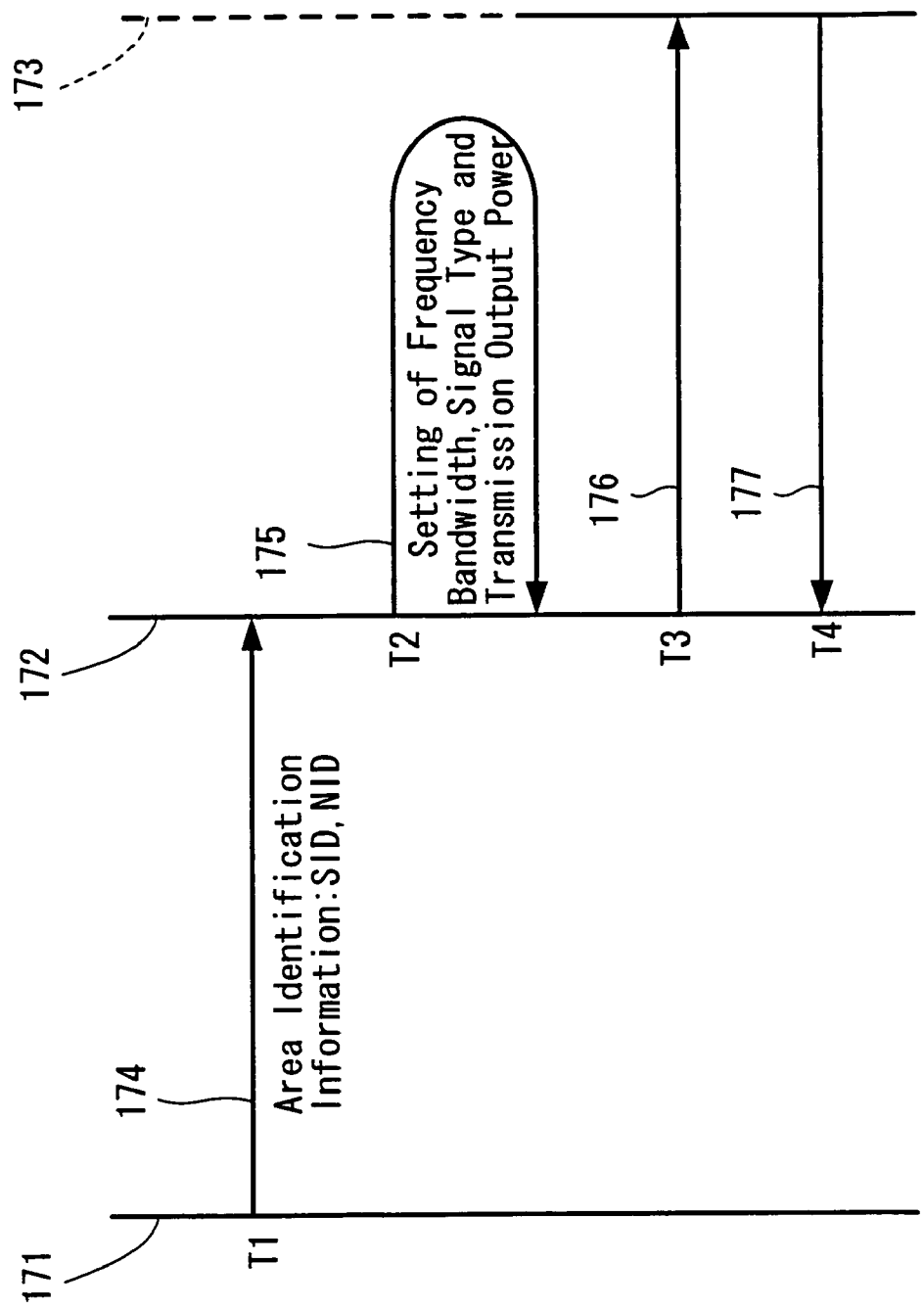
FIG. 17 is a diagram showing an activation sequence in an Ultra Wideband wireless communication system.

FIG. 17 is a diagram showing an example of an activation sequence of an Ultra Wideband wireless communication system according to another embodiment of the present invention.

When an Ultra Wideband wireless communication apparatus-1 denoted by 172 is activated, the Ultra Wideband wireless communication apparatus-1 172 receives a radio wave from a base station 171 existing in the cellular communication system at the time T1, analyzes downward control information 174 contained in the signal thereof, and acquires parameters such as a system identifier: SID, a network identifier: NID, and the like which are area identification information.

Then, at the time T2, the Ultra Wideband wireless communication apparatus-1 denoted by 172 refers to a parameter table of the Ultra Wideband wireless communication system as shown with 175 and sets parameters such as a frequency bandwidth, a signal type, a transmission output power, and the like of the Ultra Wideband wireless communication system which can be used in the corresponding area.

Further, at the time T3, the Ultra Wideband wireless communication apparatus-1 denoted by 172 starts transmission of a predetermined beacon signal in the set parameters as shown with 176 and forms an ad hoc network.

On the other hand, the sequence also shows that when an Ultra Wideband wireless communication apparatus-2 denoted by 173 is newly activated at the time T3 under the circumstances in which the predetermined beacon signal of the already existing Ultra Wideband wireless communication apparatus-1 denoted by 172 exists, the Ultra Wideband wireless communication apparatus-2 denoted by 173 receives the beacon signal 176 from the Ultra Wideband wireless communication apparatus-1 denoted by the above described 172, also starts transmission of a predetermined beacon signal 177 at the time T4 in accordance with setting of parameters thereof and forms an ad hoc network.

Figure 18:
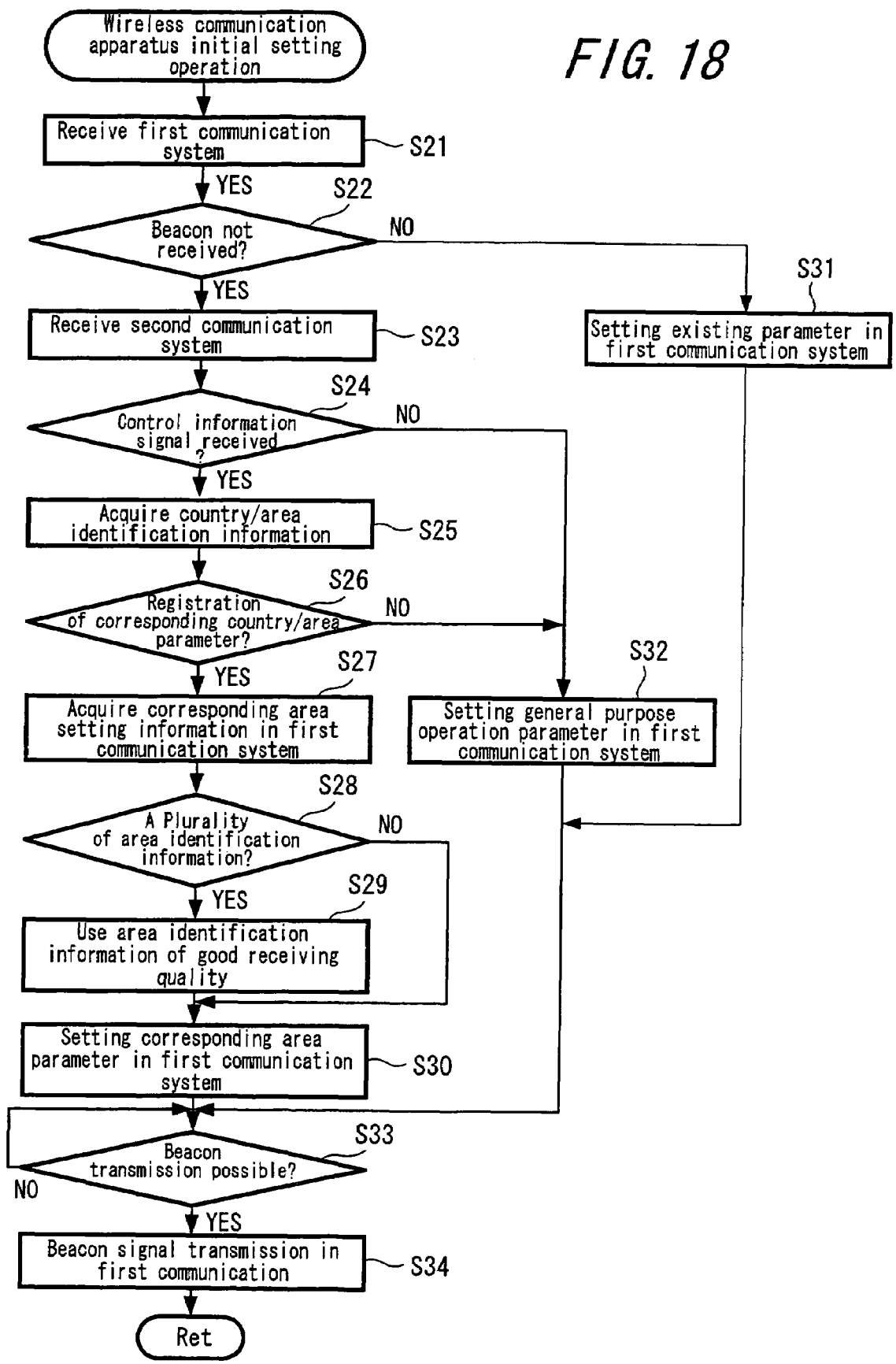
FIG. 18 is a flow chart showing an initial setting operation of a wireless communication apparatus.

FIG. 18 is a flow chart showing an initial setting operation of a wireless communication apparatus according to another embodiment of the present invention.

The wireless communication apparatus according to another embodiment of the present invention first performs receiving operation of the first wireless communication system when power is turned on (step S21). Then, if a predetermined beacon signal is not received (step S22), a receiving operation of the second wireless communication system is performed (step S23). At this time, when a predetermined downward control information signal is received (step S24), country identification information and area identification information are acquired out of the signal thereof (step S25), a parameter table of the first wireless communication system which has been stored beforehand is referred to with respect to the sets of information, whether there is a registration of parameter setting for corresponding country and area is confirmed (step S26), and setting of corresponding area identification information is acquired if there is the registration (step S27).

Further, when downward control information signals from a plurality of the second wireless communication systems are received (step S28), setting of the corresponding area identification information having excellent receiving quality is regarded as valid (step S29) and the corresponding area identification information thereof is set as parameters of the first wireless communication system (step S30). Furthermore, when the predetermined beacon signal is received in the receiving operation of the first wireless communication system, the existing parameters are set as parameters of the first wireless communication system (step S31). Also, when the predetermined downward control information signal is not received and when there is no registration of parameter setting for the corresponding country and area in the receiving operation of the second wireless communication system, parameters of general purpose are set as the parameters of the first wireless communication system (step S32).

Then, the predetermined beacon signal is formed in accordance with the parameters of the first wireless communication system which are respectively set; and when there comes the self-set timing of transmitting a beacon (step S33), a beacon signal of the first wireless communication system is transmitted (step S34), and an operation is started as a wireless ad hoc network using the first wireless communication system.

FIG. 19 is a diagram showing an example of a parameter table structure in the first wireless communication system according to another embodiment of the present invention.

Here, an example is shown, in which as international identification information 191, a country identifier: System Identify (SID) 192, an area identifier: Network Identify (NID) 193 as area identification information, Base Station Identify (BSID) 194 as respective base station identification information, and the like are defined in the second wireless communication system; and as parameters 214 which are related respectively to the above in the first wireless communication system, a frequency band (Plans A to G) 215, a signal type (Types A to G) 216, and a transmission output power (Levels A to Z) 217 are defined.

Here, the country identifier: System Identify (SID) 192 is composed of USA (US) 195, Japan (JP) 199, and Europe (EU) 209. The area identifier: Network Identify (NID) 193 is composed of: West Coast 196, Mid-West 197, and East Coast 198 in USA (US) 195; Hokkaido 200, Tohoku 201, Kanto 202, Chubu 203, Hokuriku 204, Kinki 205, Chugoku 206, Shikoku 207, and Kyushu 208 in Japan (JP) 199; Germany 210, UK 211, France 212, and Sweden 213 in Europe (EU) 209.

It is indicated that the parameters can be assigned in accordance with regulations of respective countries and further, parameters in detail can also be assigned to each area as shown in the drawing.

In other words, it is also possible to set parameters per base station that is a smaller unit than the area identifier, and such measures as restricting a transmission output power can be easily employed in the first wireless communication system in the vicinity of a facility which sensitively reacts to a radio signal, for example.

Although this table is to be stored in the information memory portion 123 of the wireless communication apparatus shown in FIG. 11, a predetermined updating command is issued to the latest setting table through the first wireless communication system or the second wireless communication system and the table can be renewed accordingly, whenever there is a change effected to an assignment of the area identifier: Network Identify (NID) 193, the respective base station identification information: the Base Station Identify (BSID) 194, and the like in the second wireless communication system.

By receiving a predetermined signal in the second wireless communication system of the above described another embodiment of the present invention, recognizing a present position of a wireless communication apparatus from the signal, and setting a frequency band, a signal type, or a transmission output power which can be used in the first wireless communication system based on the position information thereof, there is such effectiveness that it becomes possible to newly operate a first wireless communication system even in the space where the first wireless communication system has not existed.

Further, by receiving a signal from a base station of a cellular wireless communication system and distinguishing the second wireless communication system, there is such effectiveness that it is possible to set a frequency band, a signal type, and a transmission output power which are approved for usage in the corresponding country based on the country identification information thereof.

Accordingly, there is such effectiveness that it is possible to operate an Ultra Wideband communication system in a frequency band, a signal type, and a transmission output power which conform to regulations of the corresponding country without performing pre-setting.

Furthermore, when the position information of the second wireless communication system is distinguished to an area smaller than a country so as to specify, for example, an area where an operation of the first wireless communication system is restricted, there is such effectiveness that it is possible to specify the area where the usage should be restricted.

As a result, it is possible to provide a function of restricting the operation of the Ultra Wideband communication system in an area where a sensitive wireless communication system or the like exists.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A wireless communication system which can perform wireless communication with another wireless communication system, comprising:
 an area information acquisition unit configured to acquire information on an area in which the wireless communication system presently exists;
 a memory unit configured to store communication setting information on the wireless communication system corresponding to said area information;
 an area information judgment unit configured to judge the communication setting information which can be set in the wireless communication system based on the area information acquired from said area information acquisition unit; and
 a communication control unit configured to control communication settings in the wireless communication system based on the communication setting information judged by said area information judgment unit, and to control the communication settings by selecting frequency bands, signal parameters, and transmission power output values associated with different areas in which the wireless communication system can be used.

2. The wireless communication system according to claim 1, wherein
 said area information acquisition unit includes a GPS (Global Positioning System) receiving system and information on an area in which the wireless communication system presently exits is identified by means of position information acquired from said GPS receiving system.

3. A wireless communication apparatus in a wireless communication system which can perform wireless communication with another wireless communication system, comprising:
 an area information acquisition unit configured to acquire information on an area in which the wireless communication apparatus presently exists;
 a memory unit configured to store communication setting information on the wireless communication apparatus corresponding to said area information;
 an area information judgment unit configured to judge the communication setting information which can be set in the wireless communication apparatus based on the area information acquired from said area information acquisition unit; and
 a communication control unit configured to control communication settings in the wireless communication apparatus based on the communication setting information judged by said area information judgment unit, and to control the communication settings by selecting frequency bands, signal parameters, and transmission power output values associated with different areas in which the wireless communication system can be used.

4. The wireless communication apparatus according to claim 3, wherein said area information acquisition unit includes a GPS (Global Positioning System) receiving system and information on an area in which the wireless communication apparatus presently exists is identified by means of position information acquired from said GPS receiving system.

* * * * *